RADIO-TELEGRAPH SYSTEM

Filed April 19, 1954

5 Sheets-Sheet 1

INVENTOR.
Hendrik Cornelis Anthony van Duuren,
BY Brown, Jackson, Boettcher & Dienner
attys Sept. 13, 1960 H. C. A. VAN DUUREN 2,952,734

RADIO-TELEGRAPH SYSTEM

Filed April 19, 1954 5 Sheets-Sheet 2

INVENTOR.
Hendrik Cornelis Anthony vanDuuren
BY Brown, Jackson, Boettcher & Dienner
Att'y's.

Sept. 13, 1960 H. C. A. VAN DUUREN 2,952,734

RADIO-TELEGRAPH SYSTEM

Filed April 19, 1954 5 Sheets-Sheet 3

INVENTOR.

Hendrik Cornelis Anthony van Duuren

BY Brown, Jackson, Boettcher & Dienner

Atty's.

INVENTOR.
Hendrik Cornelis Anthony van Duuren
BY Brown, Jackson, Boettcher & Dienner
Att'y's Sept. 13, 1960 H. C. A. VAN DUUREN 2,952,734

RADIO-TELEGRAPH SYSTEM

Filed April 19, 1954 5 Sheets-Sheet 5

INVENTOR.

Hendrik Cornelis Anthony van Duuren

BY Brown, Jackson, Boettcher & Dienner

Att'y's.

United States Patent Office 2,952,734
Patented Sept. 13, 1960

2,952,734

RADIO-TELEGRAPH SYSTEM

Hendrik Cornelis Anthony van Duuren, Wassenaar, Netherlands, assignor to Staatsbedrijf der Posterijen, Telegrafie en Telefonie, The Hague, Netherlands Filed Apr. 19, 1954, Ser. No. 424,210

Claims priority, application Netherlands Apr. 27, 1953

18 Claims. (Cl. 178—4)

The invention relates to an installation permitting the simultaneous transmission via one channel of two messages originating from two subscribers' stations A and B and destined for two subscribers' stations C and D, respectively, provided with switching means capable of automatically sending at one end of the channel alternately one signal representing a complete character from A and one signal representing a complete character from B, each character representing signal automatically being provided with a characteristic showing whether it originates from A (and is, consequently, destined for C) or from B (and is destined for D), the other end of the channel being provided with means permitting the automatic discrimination between signals of the message destined for C and signals of the message destined for D, as well as the automatic routing of signals of the message destined for C to C and of signals of the message destined for D to D, the telegraph speed in that case being half the maximum telegraph speed to be attained in one channel. The system is further provided with means capable of automatically putting the channel only at the disposal of either A or B, if only A or only B has a message to transmit, in which case transmission can take place at the full telegraph speed.

Such an installation is known from an article published in Electrical Communication, vol. 22, No. 2, 1944, entitled, "The Western Union Varioplex Telegraph System" by O. E. Pierson. In this latter installation, however, a correct distribution requires a number of additional signals. The transmission of these signals takes much additional time. Moreover, transmission can only take place at half the telegraph speed of the main channel.

These difficulties are overcome in the installation according to the invention. In the installation according to the invention each signal is preceded by an additional element. For example, a signal from subscriber A is preceded by an element having a positive polarity whereas a signal from subscriber station B is preceded by an element having a negative polarity. The polarity of the additional element is determined by the installation itself and is automatically given.

The installation according to the invention will now be explained with reference to the figures of the accompanying drawings.

DESCRIPTION OF THE INSTALLATION ACCORDING TO THE INVENTION

Figure 1:
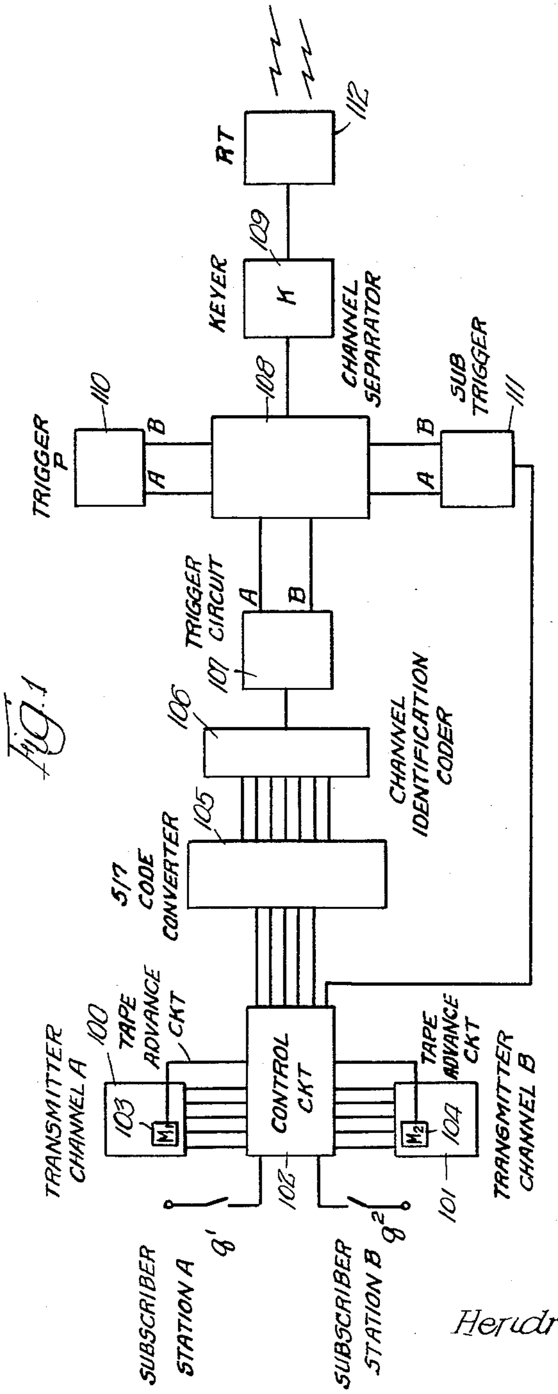
Figures 1 and 2 are schematic illustrations in block form of the transmitter and receiver respectively of the invention.
Figure 2:
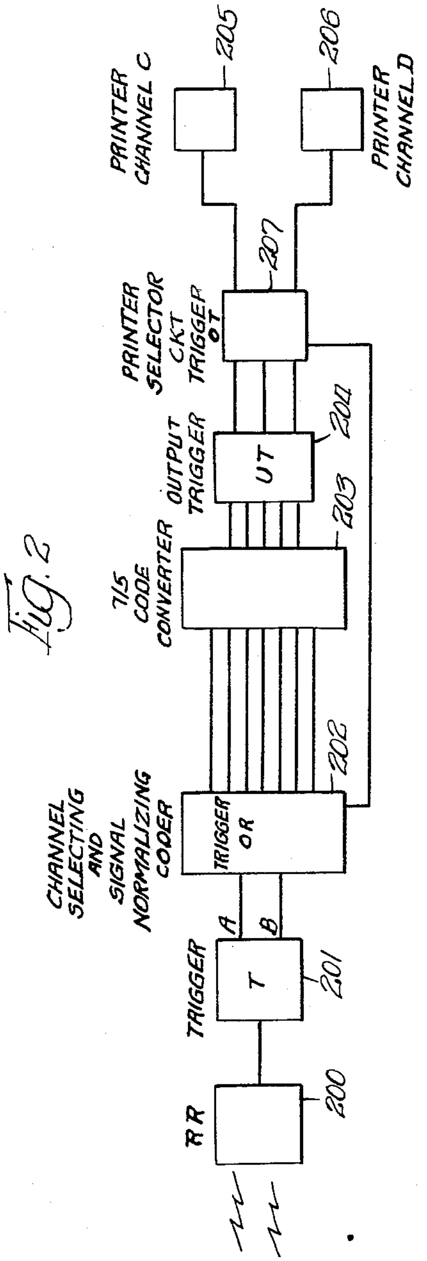

A general description of the operation of the novel telegraph system of the invention may be understood with reference to Figures 1 and 2 of the accompanying drawings in which Figure 1 is a schematic block diagram of the transmitter and Figure 2 is a schematic block diagram of the receiver of the invention.

The transmitter of Figure 1 comprises a pair of subscriber's stations A and B each including a conventional five-unit code transmitter (100 and 101 respectively) operated by means of a paper tape (not shown) having perforations arranged in five different lines or columns. Each column transverse to the five columns contains a coded arrangement of perforations corresponding to a single character. In the conventional manner a series of five fingers in the transmitter are operable to convert the coded perforations into a corresponding electrical signal comprising a variable ratio of marking and spacing elements.

A control circuit 102 is connected to the output circuits of each of the transmitters 100 and 101 and is arranged to transmit the signals from either of the subscriber stations alone, or in alternative combination as determined by the closure of contacts $q^1$ and $q^2$ either individually or together.

If contact $q^1$ is closed, subscriber station A only is permitted to transmit and the remaining equipment of the transmitter of Figure 1 is operative to transmit the message from station A without diminution of speed. If contacts $q^1$ and $q^2$ are closed, then the control circuit 102 alternately permits station A and B to transmit signals representative of a single character, in which case the speed of transmission for each station is reduced to one-half its normal rate. Tape advance circuits 103 and 104 in each of the transmitters are under the control of control circuit 102 and are operative to advance the paper tape in each of transmitters 100 and 101 one step as each signal is transmitted.

The control circuit includes indicator means, such as relay S, and its associated circuitry, for developing a control signal the polarity of which is determined by the particular station whose signal is being transmitted at any given time. Thus for a signal from station A, the control signal is of positive polarity, while in response to a signal from station B, a control signal of negative polarity is developed by control circuit 102. The control signal is employed in a later stage of the transmitter to effect selection of a signal to be transmitted and a further discussion of this feature appears hereinafter.

Connected to the control circuit 102 is a code converter 105 which may be of the type disclosed and claimed in my Patent No. 2,603,705 issued on July 15, 1952, entitled "Code Converter" and assigned to the present assignee and to which reference is made for an understanding of the specific circuitry of the code converter. A code converter of this type transforms a five-unit code signal having a variable ratio of marking and spacing elements into a seven-unit code signal having a fixed ratio of marking and spacing elements. In this case the seven-unit code signal from code converter 105 comprises three marking and four spacing elements in a coded arrangement indicative of the coded arrangement of the marking and spacing elements of the five-unit code signal introduced therein. The purpose of such transformation is directed toward protecting the transmitted signals from disturbances which may occur in their transmission over a radio path and more specifically the provision of a monitorable type which permits the ready detection of modulated signal sets and if desired, the ready reconstruction thereof.

A channel identification coder 106 is connected to the input means which include the transmitter or channel signal sources 100, 101, control circuit 102, and code converter 105, and is in the nature of an electronic distributor which converts the seven-unit code signal into a composite signal in which the marking and spacing elements are arranged to be transmitted over a single conductor in a time sequence rather than in the simultaneous arrangement hitherto used in the code converter wherein each element of a signal set is transmitted over a separately associated conductor.

In addition, the identification coder 106 adds an additional element of positive polarity at the beginning of the seven-unit code signal to identify the subscriber station which is transmitting. Consequently, the signal generated by the identification coder 106 is an eight-unit code signal having four marking and four spacing elements, with a marking (or positive) element always preceding the remaining elements.

Signal polarity means comprising a trigger circuit 107 having a single input circuit and a pair of output circuits is connected to identification coder 106 to produce a pair of signals one of which (a normal signal) is an exact replica of the input signal and the other of which (an inverted signal) is a signal identical to the input signal but inverted with respect thereto.

As used throughout the specification the term "trigger" refers to a bistable multivibrator of conventional design comprising a pair of electron discharge devices or multielectrode vacuum tubes connected in an alternatively conducting and non-conducting arrangement. A single input circuit connected between the control grid and cathode of one tube serves to apply a signal thereto to control the conductive or non-conductive status of that tube in such a manner that the output circuit connected between the anode and cathode of the tube produces a signal of positive or negative polarity in response to the application of the input signal in the previous manner. A second output circuit coupled between the anode and cathode of the second tube produces a signal of opposite polarity with respect to the signal from the first output circuit.

A channel separator circuit 108 is connected to trigger circuit 107 and transmits one of the two signals generated therein to a keyer 109. It will be recalled that control circuit 102 generated a control signal whose polarity was indicative of the station transmitting at any given time. This control signal is applied to channel separator 108 over a SUB trigger 111 and co-acts with a signal supplied from trigger 110 to cause channel separator circuit 108 to extend the normal signal from trigger 107, if station A is transmitting and the inverted signal therefrom, if station B is transmitting.

Since the identification element added at the beginning of the eight-unit signal is now either normal (of positive polarity) or inverted (of negative polarity) in the same manner as the signal extended over channel separator circuit 108, the signal itself is thus coded with reference to its originating station.

Keyer 109 is of conventional design and is employed to energize a radio transmitter 112 with a modulating signal representative of the character originated at the sending station.

The general operation of the receiver of the telegraph system of the present invention may be explained with reference to Figure 2 which is a schematic illustration in block form thereof. A radio frequency signal receiver and converter 200 of conventional design is adapted for reception of the modulated radio-frequency signal transmitted in the above-described manner over the radio-frequence path between the transmitter (Figure 1) and the receiver (Figure 2). Radio receiver and converter 200 demodulates the received signal and produces a replica of the modulating signal which is identical to that extended by channel separator 108 to keyer 109 of the transmitter.

A trigger 201 is connected to the radio receiver and operates in a manner similar to that of trigger 107 to produce a pair of signals at its output circuits, one of these signals being an exact replica of the input signal and the other being an inverted replica thereof.

Channel selecting and signal normalizing coder 202 is connected to trigger circuit 201 and operates to transform the eight-unit code signal applied thereto into a seven-unit code signal representative of the character transmitted by either channel A or B. It will be recalled that the eight-unit code signal from channel A which included an identifying element of positive polarity was transmitted unchanged in polarity from the transmitter by virtue of the operation of the channel separator circuit 108 thereof. It will also be recalled that the eight-unit code signal indicative of the character from channel B was inverted by channel separator 108 and that the channel identifying element was, therefore, of negative polarity. The channel selecting and signal normalizing circuit 202 operates to generate a control signal whose polarity is indicative of the transmitting channel, and to select the "normal" or non-inverted signal from the output of trigger A.

In this regard if the identifying element is of positive polarity, the normalizing coder circuit 202 selects that signal from the output circuit of trigger 201 which is identical to that applied to its input circuit. If, on the other hand, the identifying element is of negative polarity, indicating that an inverted signal (channel B transmitting) has been received by receiver 200, the normalizing coder circuit 202 selects the signal from the alternate or inverting output circuit of trigger 201. Hence, the signal which is applied to coder 202 is always of the same polarity as that applied to the input of trigger 107 of the transmitter prior to the separation of the signals of the message channels by the inversion of the signal from channel B.

Additionally, signal normalizing coder 202 operates as an electronic distributor and converts the eight-unit code signal from a time sequential type of signal into a signal in which each element appears on an individual output circuit. The trigger circuits shown in blocks OA—OG are bi-stable multivibrators similar to the triggers previously described but additionally have a relay in the anode circuit of one of the two tubes to generate a signal-element of either positive or negative polarity, as determined by the incoming signal in the manner described more fully hereinafter. The channel identifying element is absorbed in the coder 202 and the seven-unit code signal containing the character intelligence is extended over seven separate circuits to a seven-to-five code converter 203 wherein the signal is converted from a seven-unit code signal having a fixed ratio of marking and spacing elements into a five-unit signal identical to that produced at the output of the originating subscriber station. Such seven-to-five code converter is fully described in the patent to van Duuren hereinbefore referred to.

An output trigger 204 is connected to the code converter 203 and operates through the instrumentality of polarized relays to transform the marking and spacing elements into signals suitable to energize a printer 205 or 206 corresponding to the originating station.

To effect selection of the proper printer, a printer selector circuit 207 is connected to ouptut trigger circuit 204 and to channel selecting and signal normalizing coder 202. It will be recalled that a control signal the polarity of which is indicative of the originating station is generated in coder circuit 202. By the application of this signal to printer selector circuit 207, the printer 205 or 206 associated with the sending channel is selected and responds to the application of the five-unit code signal extended thereto from output trigger 204.

Consequently, a signal representative of a character originating at station A is received and energizes printer 205, while a signal from station B energizes printer 206. As a result the signals from stations A and B are alternately transmitted and identified by an additional element so that upon receipt by the receiver they may be segregated and used to energize the printer associated with the originating station.

While the above general description has reference to the alternate transmission of signals from stations A and B, either station alone may transmit, and under these circumstances the transmission channel is not shared by both stations. Therefore, the rate of transmission of the sending station is undiminished, as one hundred per-cent of the transmission time is useable by that station alone.

*The transmitter*

The message from subscriber A and destined for subscriber C is supplied at A by means of a perforated tape in the five units code. The message from B and destined for D arrives at B.

Figure 3:
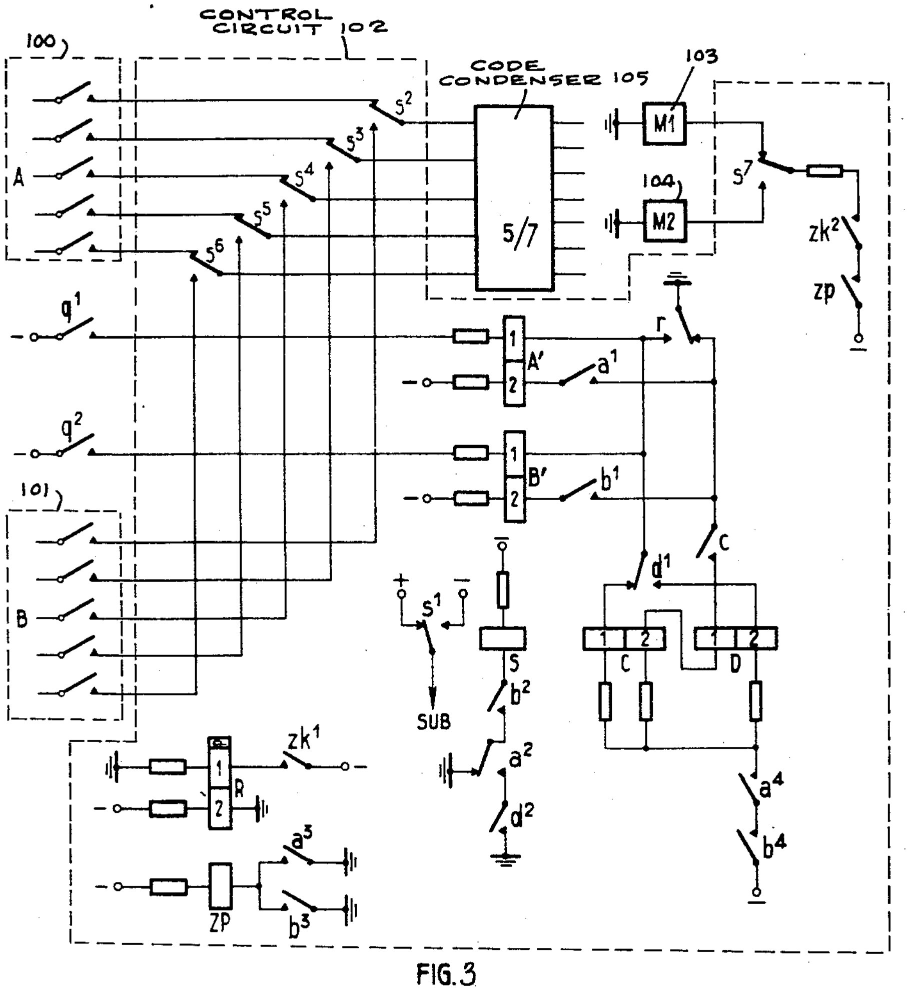
Figures 3 and 4 are schematic illustrations showing in greater detail the circuitry of the transmitter of Figure 1.

The operating arrangement for such equipment is shown in Figures 1 and 3. As there shown, if subscriber A has a message he closes contact $q^1$; if subscriber B has a message he closes contact $q^2$.

There are three possibilities:

(1) only A has a message to transmit
(2) only B has a message to transmit
(3) both A and B have messages to transmit.

If only A has a message to transmit he closes contact $q^1$. Reference is now made to relay R of control circuit 102 which is a polarized relay having an upper and a lower winding, and in accordance with the nature of such relays, controls the movement of its armature, in this case *r*, to one of two alternative positions. In its normal condition current flows through its lower winding (2) from negative battery to ground and maintains armature *r* in its illustrated position. A distributor (not shown) closes contact $ZK^1$ for a period of 25 ms. at the beginning of each period 160 ms. allotted to the transmitting station for the transmission of a complete character representative signal comprising a five-unit code. Upon closure of contacts $ZK^1$ an obvious circuit is completed for operating polarized relay R in its reverse direction over a circuit extending from negative battery, over contacts $ZK^1$, the upper winding (1) of relay R and thence to ground. Relay R operates to move armature *r* to its alternative position whereat it completes an operating circuit for relay A′. In that case a current flows through a circuit extending from negative battery, over winding 1 of Relay A′ and, front contact *r* to ground. In each interval of 160 ms. armature *r* will be changed over for 25 ms. (the five units signal is converted into a seven-unit code signal, by a code convertor of the type disclosed and claimed in the cited patent issued to H. C. A. van Duuren, to which afterwards an additional element is added, so that each signal transmitted consists of eight elements occupying together $8\times20=160$ ms.).

When contact $zk^1$ opens again polarized relay R is energized by its second winding over a circuit extending from negative battery and over the lower winding of relay R to ground, and armature *r* restores to normal again.

When contact *r* is closed, relay A′ is energized, as has been stated above, and contact $a^1$ controlled thereby is closed. When subsequently armature *r* restores to normal again, relay A′ remains energized in a holding circuit extending from negative battery, over winding 2 of relay A′, front contact $a^1$, and back contact *r*, to ground. When relay A′ is energized armature $a^2$ is changed over to the reverse position as well. This has no consequences in this case, because no circuit is closed for relay S. So armature $s^1$ remains in the normal position, so that a positive voltage is applied to a trigger designated by SUB in Fig. 4. All the *s* contacts remain at normal. As contact $a^3$ is closed too, relay ZP is energized and closes contact *zp*. The distributor (not shown) effects closure of contacts $ZK^2$ for a period of about 25 ms. prior to the termination of the 160 ms. period. When subsequently contact $zk^2$ is closed, the stepping magnet M1 will be energized via back contact $s^7$, so that the tape at A is moved to the next signal. When the signals are converted from five units signals into seven units signals each of them is given the same ratio between marking and spacing elements (3 marks—4 spaces). By the addition of one plus polarity element to a signal from A when being transmitted the ratio between marking and spacing elements becomes 4 marks—4 spaces.

A signal from B is transmitted "inverted," i.e. having 3 spaces and 4 marks. The additional element has a negative polarity in this case, so that the ratio between spacing and marking elements becomes will be 4 spaces—4 marks again. In this way both the identification elements and the intelligence elements are protected against faulty reception. Thus the installation according to the invention renders the transmission of confirmation and synchronizing signals as used in the installation described in the cited article published in Electrical Communication superfluous. If only A has a message to transmit contacts $s^2$ to $s^6$ remain in the normal condition and the message from A goes via these contacts to a code convertor which converts the five units signal into a seven units signal, as a result of which each signal is given a fixed ratio of marks and spaces. A signal leaving the code convertor has 3 marking elements and 4 spacing elements.

If only B has a message to transmit contact $q^2$ will be closed ($q^1$ being open). In this case relay B′ will be energized over a circuit extending from negative battery, over winding 1 of relay B and front contact *r* to ground. Relay B′ will hold via contact $b^1$ and winding 2 in a way analogous to that described for the case of relay A′, except that by the closure of contact $b^2$ relay S is energized.

Figure 4:
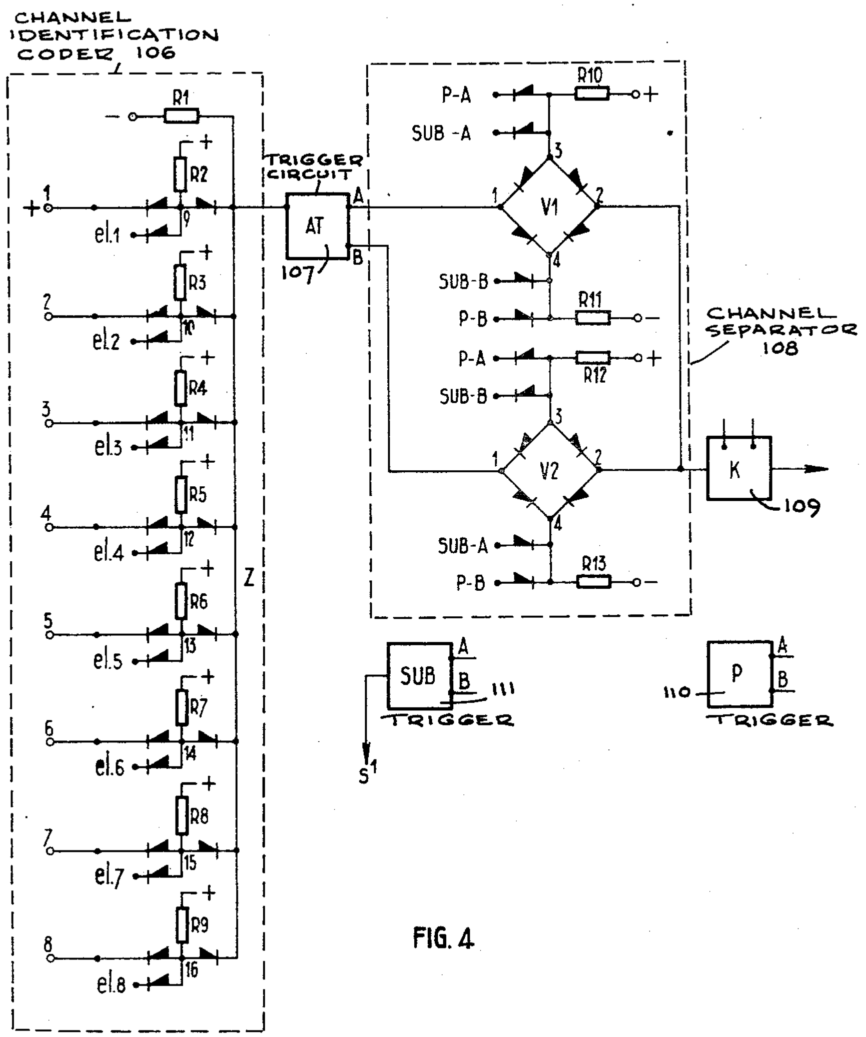

Relay S changes over contact $s^1$, so that now a negative voltage is applied to trigger SUB in Fig. 4. Further contacts $s^2$ to $s^6$ are changed over, so that the input terminals of B are connected to the code convertor. Contact $s^7$ is changed over too, so that at the appropriate instant the stepping magnet M2 moves the tape of B to a next signal.

Further the transmission takes place in the same way as in the first case. Now the third possibility will be considered of both A and B having a message to transmit.

In this case both contacts $q^1$ and $q^2$ are closed. Consequently, relays A′ and B′ are energized simultaneously. When contact *r* is changed over, both the holding contacts $a^1$ and $b^1$ close. Contacts $a^2$ and $b^2$ too are changed over simultaneously. In that case relay S will only be energized if contact $d^2$ of relay D of the counting chain more fully described hereinafter has been changed over.

Contacts $a^4$ and $b^4$ cause a counting chain consisting of relays C and D to operate. This counting chain ensures that alternately a signal from A and a signal from B are sent to the transmitter. The operation of the counting chain comprising relays C and D occurs only upon the closure of contacts $a^4$ and $b^4$ in the above described manner. When armature *r* of relay R is in its reversed position (to the left as shown in Figure 3), it is effective at its contacts to complete an energizing circuit for relay C which circuit extends from negative battery, over contacts $b^4$, contacts $a^4$, the winding (1) of relay C, contacts $d^1$ and contacts *r* to ground. Relay C operates and at its contacts C prepares an energizing circuit for the series operation of relays C and D of the counting chain. When contact $ZK^1$ opens under the control of the distributor (not shown) in the manner previously described, relay R restores to its normal condition and armature *r* returns to its illustrated position. Armature *r* effects completion of the energizing circuit for the series operation of relays C and D over a circuit extending from negative battery, over contacts $b^4$, contacts $a^4$, winding (2) of relay C, winding (1) of relay D, contacts C, contacts *r* and thence to ground. Relay C holds and relay D operates. Counting chain relay D at its contacts $d^1$ prepares its own holding circuit and at its contacts $d^2$ completes an operating circuit for the S relay, which circuit extends from negative battery, over the winding of the S relay, contacts $b^2$, contacts $a^2$ and contacts $d^2$ to ground.

Relay S operates and at its contacts $S^1$ applies negative battery to the SUB trigger 111 and at its contacts $S^7$ completes an operating circuit for the tape advance circuit 103 or 104 associated with the station then transmitting. Inasmuch as armature *r* does not reverse until the end of the transmission of the complete signal, relay D remains operated and a negative pulse will be applied to the SUB trigger during this period.

When armature *r* is reversed at the beginning of the next period of transmission, it is effective to interrupt the holding circuit for relay C which restores and does not reoperate for the next period of transmission. Hence, only for alternate transmission periods does the S relay operate to apply a negative pulse to the SUB trigger. Further, during the other alternate periods of transmission relay S restores and at its contacts $S^1$ applies a positive pulse to the SUB trigger 111.

The transmission of one signal from A requires 160 ms. After this one signal from B is transmitted, which requires 160 ms. as well (this results in half the telegraph speed with respect to the case that either A or B transmits messages alone). The counting chain controls inter alia contact $d^2$. Consequently, this contact is in the normal position for 160 ms. (a signal from A is transmitted then) and alternatively in the reverse position (in that case a signal from B is transmitted).

At the same time relay S ensures that trigger SUB in Fig. 4 is alternately controlled via contact $s^1$ by a positive and a negative voltage notably by a positive voltage when a signal from A is transmitted and by a negative voltage when a signal from B is transmitted.

Fig. 4 shows diagrammatically in what way the signal is automatically provided with an identification element indicating whether the signal originates from A or from B.

Point 1 (Fig. 4) is continuously provided with a positive voltage. The seven signal elements issuing from the code convertor of Fig. 1 are applied to points 2 to 8. Points *el* 1 to *el* 8 are provided with voltages as graphically shown in Fig. 5*a*. Point *el* 1 for instance is provided for 20 ms. with a positive potential, after which it receives a negative potential for 140 ms.

When the first 20 ms. have elapsed, *el* 2 will become positive for 20 ms., etc. Points 9 to 16 are provided via resistors R2 to R9 with a positive voltage. At the same time these points are connected via rectifiers to points *el* 1 to *el* 8, respectively. Further these points are connected via rectifiers to points 1 to 8.

Finally they are connected via rectifiers to a common rail Z which leads to the input terminal of trigger AT. Rail Z is provided via a high-ohmic resistor R1 (high-ohmic with respect to the forward resistance of a rectifier) with a negative voltage.

When the positive voltage (of Fig. 5*a*) appears for 20 ms. at point *el* 1, point 9 will become positive, as point 1 is positive too.

This positive voltage renders rail Z positive via the rectifier and the input terminal of trigger AT too receives a positive control voltage.

When next the positive voltage appears at point *el* 2 for 20 ms., point 10 will become positive as well, if point 2 is positive too (a marking element occurring at this moment will produce a positive voltage at point 2). The input terminal will be controlled by a positive voltage again.

When next the positive voltage appears at point *el* 3 for 20 ms. and a spacing element (having a negative polarity) is applied to point 3 e.g., point 11 will become negative. In that case rail Z will become negative under the influence of the negative voltage supplied via resistor R1 and trigger AT will be controlled by a negative voltage.

As all of the further points *el* 4 to *el* 8 are successively rendered positive for 20 ms. rail Z will become positive if the element applied to the relevant input terminal is a marking element and negative if the element applied to the input terminal is a spacing element.

Thus in the case of a marking element arriving at points 2 to 8 trigger AT will be controlled by a positive voltage and in the case of a spacing element it will be controlled by a negative voltage. Points A and B of the trigger are so connected to the anodes of the two tubes of this trigger that if a marking element arrives, point A is positive and B negative. In the case of a spacing element a negative voltage is applied to the trigger and point A becomes negative and B positive.

Consequently, as a signal element arrives it will appear with the same polarity (normal) on the line connected to point A of trigger AT and with the opposite polarity (inverted) on the line connected to point B.

Between the output terminals A and B of trigger AT and the keyer K which keys the transmitter two rectifier circuits $V_1$ and $V_2$ have been provided.

If the message originates from A (and is destined for C) it is so arranged that the message is transmitted normal, so that point A of the trigger must be connected in that case via the rectifier circuit $V_1$ to the keyer K (the connection between point B of trigger AT and keyer K must be blocked then). If the message originates from B (and is destined for D) the working of the arrangement is such that the message is transmitted "inverted," so that in that case the connection between point B and the keyer is established (the connection between point A and the keyer must be blocked then).

These operations are effected by the two rectifier circuits $V_1$ and $V_2$. These circuits are controlled by the co-operation of a sub-trigger (see Fig. 4, SUB) and a pulse-trigger P.

Figure 5:
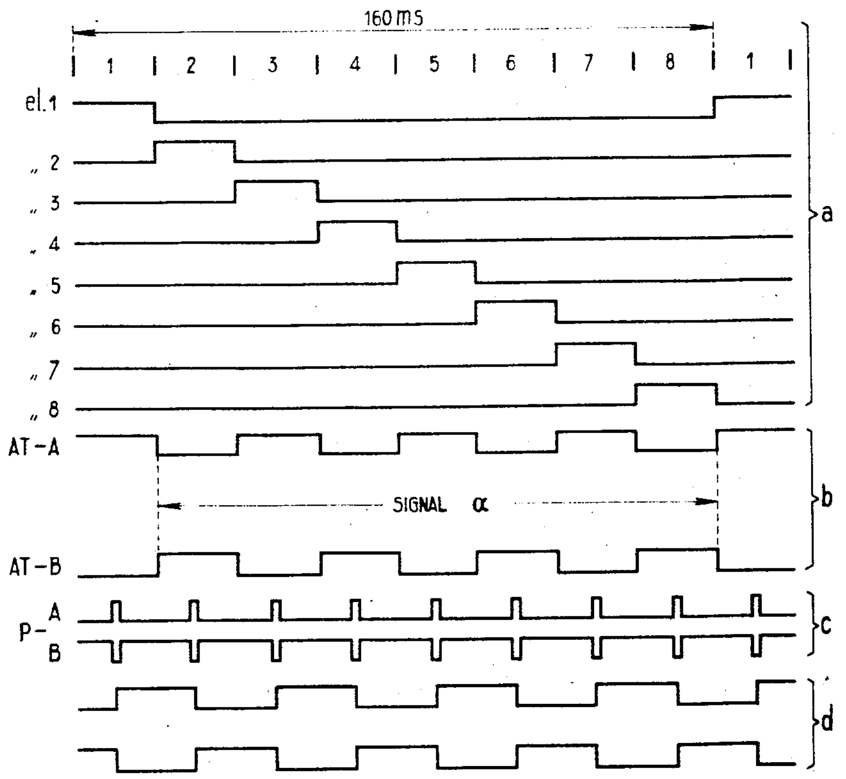
Figure 5 is a graphical illustration of wave forms useful in explaining the operation of the transmitter and receiver of the invention.

The transmission of a signal idle time $\alpha$, as represented in Fig. 5*b* will now be explained. This signal is transmitted in the seven units code as: space, mark, space, mark, space mark, space. To each signal an eighth element is added. This is done my means of the voltages supplied at points 1, *el* 1 and 9.

In co-operation with the battery voltage applied via R2 these voltages always cause a positive control voltage to be applied to trigger AT in the period when a positive voltage appears at point *el* 1. During this interval the output terminal A of the trigger AT is positive and the output terminal B negative (see Fig. 5*b*). Thus the first element will always produce a positive potential at terminal A and a negative potential at terminal B of trigger AT.

The further course of the line in Fig. 5*b* is self-evident. The first line represents the voltage occurring at point A, the second line giving the voltage occurring at point B of trigger AT.

The SUB-trigger is controlled by a voltage applied to it via contact $s^1$ in Fig. 3. This is a positive voltage if a signal from A is transmitted and negative if a signal from B is transmitted, as has been described above.

If a signal arrives from A the output terminal A of trigger SUB (which terminal will be designated by SUB A in what follows) will be positive whereas terminal B (to be designated by SUB B) will be negative. If next a signal arrives from B, SUB A will be negative and SUB B positive.

The voltages thus appearing at points SUB A and SUB B are applied to the correspondingly marked points of the rectifier circuits $V_1$ and $V_2$.

The pulse-trigger P (Fig. 4) issues a pulse voltage as indicated in Fig. 5*c*. On the first line of Fig. 5*c* the pulse voltage is plotted as it appears at point A of the pulse-trigger (designated by P—A in what follows). On the second line of Fig. 5*c* the pulse voltage is plotted as it appears at point B of the pulse-trigger (designated by P—B in what follows).

The voltages occurring at points P—A and P—B of the pulse-trigger P are applied to the correspondingly marked points of the rectifier circuits V1 and V2.

Further the rectifier circuits V1 and V2 are connected via resistors R10 and R12 to a positive voltage source and via R11 *et* R13 to a negative voltage source.

By the co-operation of the voltages from trigger SUB and pulse-trigger P a signal from subscriber's station A controls the keyer via rectifier circuit V1 and a signal from subscriber's station B controls the keyer via rectifier circuit V2.

Supposing a signal from A is transmitted first, the SUB-trigger is controlled by a positive voltage. Point SUB–A becomes positive, as well as the corresponding point of rectifier circuit V1. When the positive pulse of the pulse-trigger P appears, point P—A of the rectifier circuit will become positive as well. Consequently, point 3 of the rectifier circuit V1 will be positive too.

Further points SUB–B and P—B of rectifier circuit V1 will be negative, so that point 4 is negative too.

Consequently, a current will be set up from point 3 to point 4 via two sides of the bridge circuit of rectifiers, V1, so that there will be a connection between points 1 and 2.

In that case point SUB–A of rectifier circuit V2 is positive and point P—B negative when the pulse voltage occurs. Point 4 is positive then. Further point SUB–B of rectifier circuit V2 is negative and point P—A positive. Point 3 is negative then. Under these circumstances rectifier circuit V2 is blocked. Consequently, the keyer K is controlled by the voltage at point A (of AT) and not by the voltage at B.

When the first element (a spacing element) of the idle time $\alpha$ signal from A arrives it will find, when the pulse-voltage from trigger P appears, a conducting path from 1 to 2 of rectifier circuit V1, in accordance with the above explanation. The spacing element will be applied to the keyer as a spacing element (normal). The following elements of the idle time $\alpha$ signal will be passed on as indicated on the upper line of Fig. 5*d*.

Assuming now that a signal for B arrives the SUB-trigger is controlled by a negative voltage, so SUB–A becomes negative, as well as the corresponding point of rectifier circuit V2. When the negative pulse of the pulse-trigger P appears, point P—B of the rectifier circuit will become negative as well. Point 4 of rectifier circuit V2 will be negative then. Further points SUB–B and P—A of rectifier circuit V2 will be positive, so that point 3 will be positive too. Consequently, a current will be set up in the rectifier circuit, flowing from point 3 to point 4 over the two sides of the bridge circuit of rectifiers, V2, so that there will be a conductive connection between points 1 and 2. Point SUB–A of rectifier circuit V1 is negative in that case and point P—A becomes positive when the pulse voltage appears. So point 3 becomes negative. Further point SUB–B of rectifier V1 is positive and point P—B negative. Point 4 will be negative in consequence. Under these circumstances rectifier circuit V1 will be blocked. As a result of this keyer K is controlled by the voltage appearing at terminal B of trigger AT and not by the voltage appearing at terminal A thereof.

When the first element (a spacing element) of the idle time $\alpha$ signal arrives from station B, it will be passed on inverted over output terminal B of trigger AT since, when the pulse voltage from trigger P appears, a conductive connection will be established between points 1 and 2 of rectifier circuit V2, in accordance with the description given above. Consequently, the spacing element will be passed on to the keyer as a marking element (inverted). The following elements of the idle time $\alpha$ signal will be passed on as indicated on the lower line of Fig. 5*d*.

*The receiver*

Figure 6:
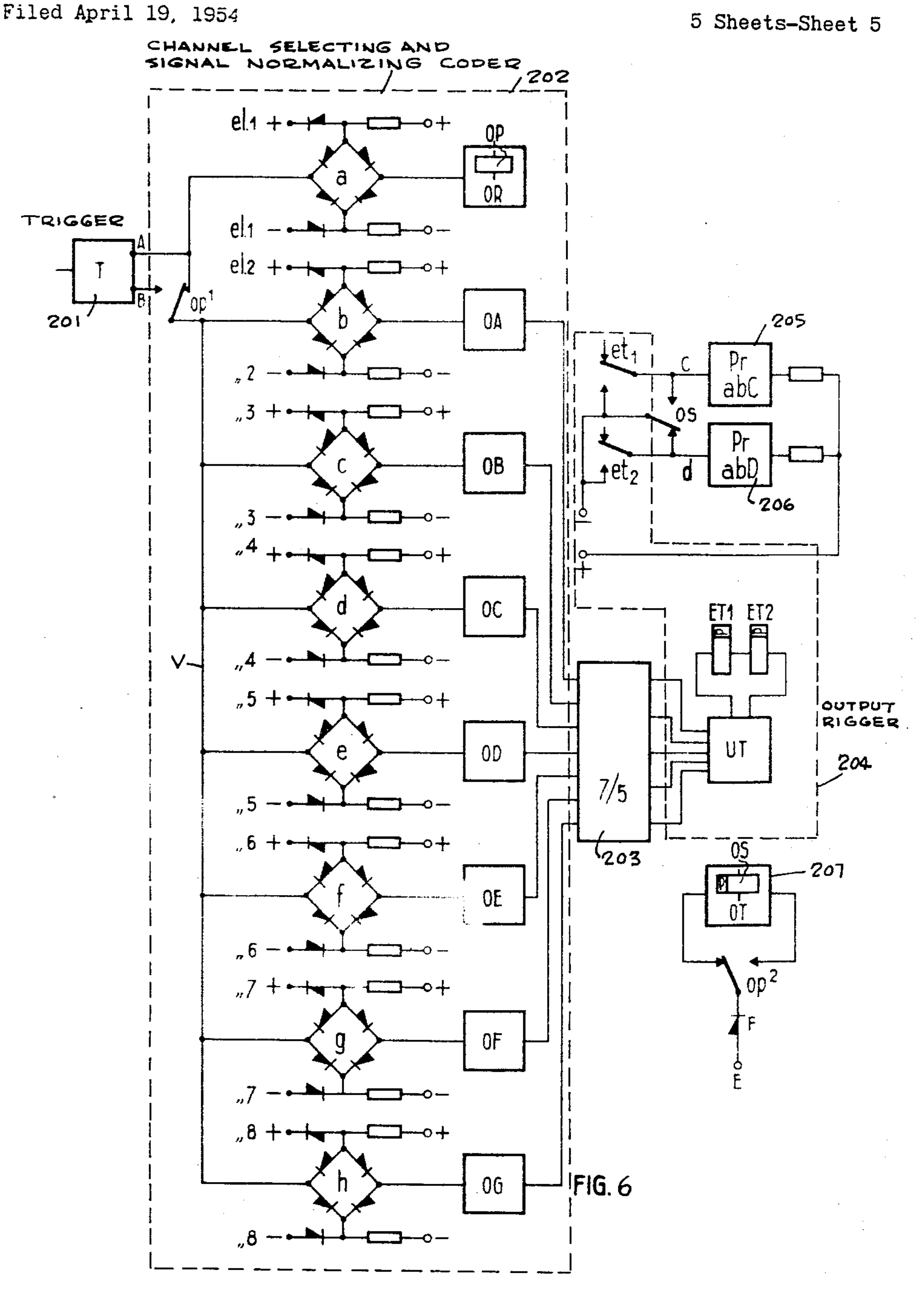
Figure 6 is a schematic illustration showing in greater detail the circuitry of the receiver of Figure 1.

Fig. 6 shows diagrammatically the receiver. The signal received controls the input trigger T. To facilitate the understanding the reception of a signal will be considered as has been indicated in the description of the transmitter and represented in Fig. 5*b* and *d*. The first element from A is always a marking element and the first element from B is always a spacing element. It is supposed that a marking element causes a positive potential at the output terminal A of trigger T (this terminal will be called T—A in what follows), whereas a spacing element results in a negative potential at T—A. Further a signal from A will appear normal at terminal T—A, whereas a signal from B will appear inverted at terminal T—A (it has been transmitted inverted). Consequently, a signal from B will appear normal at point B of trigger T (this point is designated by T—B further on).

Relay OP (the energization winding of which is connected in the anode circuit of one of the tubes of trigger OR) ensures by means of contact $op^1$ that the common rail V, on reception of a signal from A, is connected via back contact $op^1$ to T—A, and on reception of a signal from B via front contact $op^1$ to T—B. Thus the inverted signals are rendered normal again in the receiver. So on rail V signals from A as well as signals from B arrive normal.

The change-over of contact $op^1$ is effected by relay OP. The trigger in which this relay is incorporated is connected via rectifier circuit *a* to T—A. This rectifier circuit offers at intervals determined by a distributor a conducting connection from T—A to trigger OR. The first element of a signal from A, always a marking element, causes relay OP to take the normal position. The first element of a signal from B, always a spacing element, causes relay OP to take the reverse position. Thus a signal from A goes from T—A via back contact $op^1$ to the common rail V, whereas a signal from B goes from T—B via front contact $op^1$ to the common rail V. The establishment of the conducting connection between T—A and trigger OR is effected by an electronic distributor EL (not separately shown). This electronic distributor contains eight times two tubes. In the anode circuits of the respective eight parts of the distributor there appear voltage pulses as shown in Fig. 5*a* by *el*1 to *el*8. These voltage pulses are sent to the correspondingly marked points in Fig. 6. A point marked + is connected by the anode of the tube which is not conducting in the interval determined by the distributor and indicated in Fig. 5*a*. A point marked − is connected to the anode of the other tube. At the moment when the pulse potential appears at point *el*1+ (see Fig. 5*a*), the rectifier circuit *a* will form a conductive connection from T—A to trigger OR. Trigger OR will cause relay OP to assume the normal position on arrival of a element from A and the reverse position on arrival of a first element from B. Relay OP will correspondingly actuate its contacts $op^1$. The first element of a signal finds rectifier *a* conductive, the second element of a signal finds rectifier circuit *b* conductive. Thus the second element, the first one of the seven units code will control trigger OA, which in the case of a marking element will issue e.g. a positive potential and in the case of a spacing element a negative potential. Control trigger OA, as well as control triggers OB—OG, may be of the conventional design previously described except that a relay is provided in only one output circuit to provide a signal whose polarity is determined by the polarity of the input signal applied thereto. The rectifier circuit *b* becomes conductive when the positive potential appears at point *el*2+ at a moment determined by the distributor (see also Fig. 5*a*). Thus the seven elements of a signal will successively control, via rectifier circuits *b* to *h*, respectively, the corresponding triggers OA to OG and the seven units signal will appear at the output terminals of these triggers. This signal is led subsequently to a code converter 7/5 which converts it into a five units signal, which has to be sent to the relevant subscriber.

The output terminal of the code converter 7/5 is connected to the output trigger UT. In the anode circuits of the two tubes of this trigger there are polarized relays ET1 and ET2. Contacts $et^1$ and $et^2$ of relays ET1 and ET2 key in co-operation with contact *os* of relays OS the printers of stations C and D as determined by the position of contact *os*. The position of contact *os* depends on the energization of relay OS in the anode circuits of trigger OT. When leaving the 7/5 converter the signal has five intelligence elements preceded by a start element and followed by a stop element.

By way of example it is assumed that such a signal originates from B and is destined for D. During the stop element of the preceding signal a positive pulse is applied to point E. After this pulse point E becomes negative (as a result of the presence of rectifier F trigger OT will not react upon this negative voltage). Trigger OT is so controlled by the positive pulse applied to it via rectifier F and reverse contact $op^2$ (since relay OP received a reverse energization as a result of the first element of the signal from B) that relay OS takes the reverse position. Contact *os* is changed over then and point *c* is continuously provided with a negative voltage during the following signal (a signal from B). Thus the signal from B is passed to D by means of contact $et^2$. A marking element e.g. will find contact $et^2$ in the position shown, whereas a spacing element will find it in the reverse position.

When the next signal arrives (a signal from A) armature *op* will be restored to normal, opening a free path to outlet C as is easily seen from the above description in conjunction with the figure.

If only signals for A arrive, contact $op^2$ will constantly be at normal; relay OS will always be controlled in the same way (its armature *os* being in the normal position shown), and only outlet C will be keyed.

If only signals for B arrive outlet D will constantly be keyed.

While I have illustrated and described what I regard to be the preferred embodiment of my invention, nevertheless it will be understood that such is merely exemplary and that numerous modifications and re-arrangements may be made therein without departing from the essence of the invention, I claim:

1. In a telegraph system over which coded signals are transmitted, each signal being comprised of a given number of marking and spacing elements, a distributor arrangement for distributing each of the elements of a given signal in time sequence comprising a plurality of rectifier networks, the number of networks being one more in number than said given number, each rectifier network being comprised of at least three rectifier members and at least a first and a second signal input circuit, means for applying a predetermined fixed signal element to said first signal input circuit of one of said networks, and for applying each successive element of the given signal to said first signal input circuit of respectively different ones of the remaining networks, an output circuit for each of said rectifier networks, and means for applying an enabling voltage to the second input circuit of said networks in sequence to effect the extension over the network output circuits of the signals applied to their first input circuits, whereby said distributor arrangement adds one predetermined element to each signal outgoing therefrom.

2. In a telegraph system, signal means including at least a first and a second signal source, register means coupled to said signal means to provide signals of a given number of elements, a plurality of rectifier networks, the number of networks being one more in number than said given number, each rectifier network being comprised of at least three rectifier members and at least a first and a second signal input circuit, control means for applying each successive element of a registered signal to the first signal input circuit of a correspondingly different one of the rectifier circuits, a trigger circuit for providing a first and a second output signal element responsive to the receipt of a single signal element, distributor means for connecting an enabling voltage to the second signal input circuit of each rectifier network in sequence to effect extension of each registered signal element in sequence to said trigger circuit, and control means for selecting the first signal element output of said trigger circuit whenever the signal originated at said first source, and the second signal element output of said trigger circuit whenever the signal originated at said second source.

3. In a telegraph system a channel selector comprising a first incoming signal path for supplying a first signal set to said channel selector, a second incoming signal path for simultaneously supplying a second signal set thereto, an output path, a first bridge rectifier network including an input terminal connected to said first path and an output terminal connected to said output path for applying said first signal set from said input path to said output path, a second bridge rectifier network including an input terminal connected to said second path and an output terminal connected to said output path for extending said second signal set from said second path to said output path, and control means connected to at least one control terminal of said first and second rectifier bridges for selectively applying at least one enabling signal to said first and second rectifier networks to control the operation thereof in the selective extension of only one of said two simultaneous signal sets to said output path at any time.

4. In a telegraph system as set forth in claim 3 in which said control means includes means connected to a second control terminal for each of said rectifier bridge networks to control same to extend its associated signal set to the output path only responsive to the application thereto of a second enabling signal simultaneously with said first enabling signal.

5. In a telegraph system as set forth in claim 3 in which said control means includes means operative with application of an enabling signal to one of the control terminals of one of said rectifier bridge networks to simultaneously apply a disabling signal to a control terminal of the other of said rectifier networks.

6. In a telegraph system channel means over which coded signal sets are received from several stations, each signal set on the channel being comprised of a given ratio of marking and spacing elements, and including at least one identifying element which indicates the station of origin of that signal set, receiver means coupled to said channel means operative to examine the signal incoming to said receiver as to its indicated station of origin, and means coupled to said receiver means for effecting extension of the signals of a set from the one station over a first associated path and the signals of a set from the other station over a second associated path.

7. A telegraph system as set forth in claim 6 in which said signal sets on said channel each comprise four marking and four spacing elements, and in which the identifying element comprises a marking element as the prefix for the signal sets from one station and a spacing element as the prefix for the signal sets of the other station.

8. In a telegraph system channel means over which coded signals are received from at least a first and second station, each signal on the channel being comprised of a fixed ratio of marking and spacing elements and including one identifying element which indicates the station of origin of that signal, receiver means connected to channel means including means operative with the receipt of each signal set to provide a first signal set identical with the received signal set and simultaneously a second signal set inverted from said first signal set, means for examining the identifying element of said first signal, and selector means operatively controlled to select one of said signal sets for use in accordance with the originating station indicated by said identifying element.

9. A telegraph system as set forth in claim 8 which includes transmitter means for transmitting normally the signal sets which originate at one station and for transmitting in an inverted manner the signal sets which originate at the second station, and means for adding an identical prefix element to the signals derived from each source prior to application to said transmitter means.

10. A telegraph system as set forth in claim 8 which includes code converter means for translating the signal selected by said selector means for use, and printer means for printing the signals as translated.

11. In a telegraph system having input means for coupling signals to the system including a first and second channel source of signals, indicator means coupled to said input means operative to generate a first indicator signal responsive to the receipt of a signal from the first channel source, and a second indicator signal responsive to the receipt of a signal from the second channel source; coder means connected to said input means operative to add a predetermined element to each of said signals, the additional element being of the same polarity characteristics for the signals of each channel source, signal polarity means connected to said channel identification coder means for providing a first signal element of one polarity and a second signal element of an opposite polarity for each signal element which is coupled thereto, an output circuit, and channel separator means connected to said signal polarity means and said indicator means operative responsive to the receipt of said one indicator signal to couple the element of said one polarity to the output circuit and operative responsive to receipt of said second indicator signal to couple the element of said opposite polarity to said output circuit.

12. In a telegraph system having input means for coupling fixed ratio signals to the system including a first and second channel source of signals, indicator means coupled to said input means operative to generate a first indicator signal responsive to the receipt of a signal from the first channel source, and a second indicator signal responsive to the receipt of a signal from the second channel source, channel identification coder means connected to said input means operative to add a predetermined element to each of said signals, the additional element being of the same polarity characteristics for the signals of each channel source, signal polarity means connected to said channel identification coder means for providing a first signal element of one polarity and a second signal element of an opposite polarity for each signal element which is coupled thereto, an output circuit, and channel separator means connected to said signal polarity means and said indicator means operative responsive to receipt of said first indicator signal to couple each of the elements of said one polarity for a signal to said output circuit, and operative responsive to the receipt of said second indicator signal to couple each of the elements of the opposite polarity for a signal to the output circuit, whereby fixed ratio output signals are provided for each signal received over said input means, each of which output signals includes an element which identifies the originating source of the signal.

13. In a telegraph system as set forth in claim 12 in which said channel identification coder means comprises a plurality of rectifier networks, the number of networks being one more in number than the number of elements in said signal, means for applying a predetermined fixed signal element to one of said networks, and the different elements of each signal received over said input means to the different ones of the remaining networks, and means for applying an enabling voltage to said networks to effect the extension in sequence of the signal elements registered thereon to said signal polarity means, whereby said channel identification coder means effects the addition of a predetermined element to each output signal without disturbing the fixed ratio of the signals.

14. In a telegraph system as set forth in claim 12 in which said channel separator means comprises a first bridge rectifier network having a first junction connected to said signal polarity means for control by said signal elements of said one polarity, a second junction connected to said output circuit, a third junction connected for control by said first indicator signal and one output of a trigger pulser circuit, and a fourth junction connected for control by said second indicator signal and the other output signal of said trigger circuit, and a second bridge rectifier network having a first junction connected to the signal polarity means for control by said signal elements of said opposite polarity, a second junction connected to said output circuit, a third junction connected for control by said second indicator signal and said one output signal of said trigger pulser circuit, and a fourth junction connected for control by said first indicator signal and said other output signal of said trigger pulser circuit.

15. In a telegraph system having input means for coupling fixed ratio signals to the system including a first and second channel source of signals, indicator means coupled to said input means operative to generate a first indicator signal responsive to the receipt of a signal from the first channel source, and a second indicator signal responsive to the receipt of a signal from the second channel source, channel identification coder means operative to add a predetermined prefix element to each of the signals to provide eight unit signals, the prefix element, as added, being of the same polarity characteristics for the signals of each channel source, signal polarity means connected to said channel identification coder means for providing a first signal element and a second signal element of opposite polarities for each signal element which is coupled thereto, and channel separator means connected to said signal polarity means and said indicator means including an output circuit, a first means operative responsive to receipt of said first indicator signal to couple the elements of said one polarity to said output circuit, and a second means operative responsive to the receipt of said indicator signal to couple the elements of said opposite polarity to the output circuit, whereby the output signals for the different sources are in a fixed ratio, eight unit code, and include a prefix element which identifies the source of the signal.

16. In a telegraph system having input means for coupling fixed ratio signals to the system including a first and second channel source of signals, means operative to select the signals from said sources in an alternate pattern with the occurrence of signals in each channel source, and operative to select signals from one source at a speed which is twice that of such operation with the occurrence of signals in only one source, indicator means operative to generate a first indicator signal responsive to the selection of a signal from the first channel source, and a second indicator signal responsive to the selection of a signal from the second channel source, channel identification coder means operative to add a predetermined element to each of the selected signals, the additional element being of the same polarity characteristics for the signals of each channel source, signal polarity means connected to said channel identification coder means for providing a first signal element and a second signal element of opposite polarities for each output signal element of said coder means which is coupled thereto, and channel separator means connected to said signal polarity means and said indicator means including an output circuit, a first means operative responsive to receipt of said first indicator signal to couple the element of said first polarity to said output circuit, and a second means operative responsive to the receipt of said second indicator signal to couple the elements of said second polarity to the output circuit, said additional element in the signals of the different channels thus being of different polarities to enable the equipment to immediately recognize the source, and thereby permit operation of the system at increased speeds with the occurrence of signals in only one channel source.

17. In a telegraph system having at least a first and a second channel source of signals comprised of a number of marking and spacing elements in a predetermined code, control circuit means connected to said channel sources including switching means for separately selecting the signals of each of the different channel sources for transmission purposes, indicator means operative to generate a first indicator signal responsive to the selection of a signal from the first channel source, and a second indicator signal responsive to the selection of a signal from the second channel source; code converter means connected to said control circuit means for converting said code signals to a fixed ratio code, channel identification coder means operative to add a predetermined element to each of the selected signals, the additional element being of the same polarity characteristics for the signals of each channel source, and signal polarity means connected to said channel identification coder means for providing a signal element of a first polarity and a signal element of a second polarity for each signal element which is coupled thereto, an output circuit, and channel separator means connected to said signal polarity means and said indicator means operative responsive to receipt of said first indicator signal to couple the elements of said first polarity to said output circuit, and operative responsive to the receipt of said second indicator signal to couple the elements of the second polarity to the output circuit.

18. In a telegraph system having a communication link including a transmitter and a receiver unit, input means for providing fixed ratio signals including a first and second channel source of signals, indicator means coupled to said input means operative to generate a first indicator signal responsive to the receipt of a signal from the first channel source, and a second indicator signal responsive to the receipt of a signal from the second channel source, channel identification coder means operative to add a predetermined element to each of the selected signals, the additional element being of the same polarity characteristics for the signals of each channel source, signal polarity means connected to said coder means for providing a first element of one polarity and a second element of another polarity for each element coupled thereto, means connected to said signal polarity means and said indicator means operative responsive to receipt of said first indicator signal to couple said elements of said first polarity to said transmitter unit, and operative responsive to the receipt of said second indicator signal to couple the elements of said second polarity to said transmitter, whereby each signal out-going from said transmitter is of a fixed-ratio and includes an element which identifies the source of the signal, means in said receiver means operative with the receipt of each signal to provide a first signal identical with the received signal and simultaneously a second signal inverted from said first signal, means for examining the identifying element of said first signal, and selector means operatively controlled to select one of said signal sets for use in accordance with the originating source indicated by said identifying element.

References Cited in the file of this patent

UNITED STATES PATENTS

| | | |
|---|---|---|
| 1,873,785 | Ranger | Aug. 23, 1932 |
| 2,068,711 | Robinson et al. | Jan. 26, 1937 |
| 2,070,950 | Mathes | Feb. 16, 1937 |
| 2,082,740 | Phinney | June 1, 1937 |
| 2,300,463 | Palme | Nov. 3, 1942 |
| 2,404,565 | Bumstead | July 23, 1946 |
| 2,563,589 | Hertog | Aug. 7, 1951 |
| 2,574,362 | Warburton | Nov. 6, 1951 |
| 2,625,601 | Halvorsen | Jan. 13, 1953 |
| 2,682,574 | Canfora et al. | June 29, 1954 |
| 2,687,451 | Slayton | Aug. 24, 1954 |
| 2,744,955 | Canfora | May 8, 1956 |

FOREIGN PATENTS

| | | |
|---|---|---|
| 642,244 | Great Britain | Aug. 30, 1950 |